United States Patent [19]

Raagaard et al.

[11] Patent Number: 4,886,337
[45] Date of Patent: Dec. 12, 1989

[54] MANIPULATOR DEVICE FOR THE TRANSFER OF LASER LIGHT INTO AN OPTICAL FIBER

[75] Inventors: Jacob Raagaard; Claus J. Nielsen, both of Lyngby, Denmark

[73] Assignee: DantecElectronik, Medicinsk OG Videnskabeligt Måleudstyr A/S, Skovlunde, Denmark

[21] Appl. No.: 236,205

[22] Filed: Aug. 25, 1988

[30] Foreign Application Priority Data

Aug. 31, 1987 [DK] Denmark .............................. 4550/87

[51] Int. Cl.$^4$ ................................................ G02B 6/36
[52] U.S. Cl. ........................... 350/96.20; 350/96.18; 350/96.15
[58] Field of Search ............... 350/96.15, 96.17, 96.18, 350/96.20, 96.21; 250/227

[56] References Cited

U.S. PATENT DOCUMENTS

| | | | |
|---|---|---|---|
| 4,060,309 | 11/1977 | Le Noane et al. | 350/96.18 X |
| 4,445,753 | 5/1984 | Collignon | 350/96.21 |
| 4,447,119 | 5/1984 | Beasley | 350/96.18 |
| 4,475,788 | 10/1984 | Tomassini et al. | 350/96.20 |
| 4,542,956 | 9/1985 | McCrickerd | 350/96.20 |
| 4,548,466 | 10/1985 | Evans et al. | 350/96.20 |
| 4,673,245 | 6/1987 | Kling et al. | 350/96.20 |
| 4,776,663 | 10/1988 | Malinge et al. | 350/96.20 |
| 4,792,206 | 12/1988 | Skuratovsky | 350/96.21 |

FOREIGN PATENT DOCUMENTS

| | | | |
|---|---|---|---|
| 2626243 | 1/1983 | Fed. Rep. of Germany | 350/96.21 X |
| 3224631 | 1/1983 | Fed. Rep. of Germany | 350/96.21 X |
| 3238049 | 3/1984 | Fed. Rep. of Germany | 350/96.18 X |
| 3323653 | 11/1984 | Fed. Rep. of Germany | 350/96.18 X |
| 442454 | 12/1985 | Fed. Rep. of Germany | 350/96.21 X |
| 442558 | 1/1986 | Fed. Rep. of Germany | 350/96.20 X |
| 2486664 | 1/1982 | France | 350/96.20 X |
| 148201 | 5/1983 | Norway | 350/96.18 X |
| 440410 | 7/1985 | Sweden | 350/96.20 X |
| 2111239A | 11/1982 | United Kingdom | 350/96.18 X |
| 2120400A | 11/1983 | United Kingdom | 350/96.18 X |
| 2139377A | 11/1984 | United Kingdom | 350/96.18 X |

Primary Examiner—William L. Sikes
Assistant Examiner—Brian M. Healy
Attorney, Agent, or Firm—Larson & Taylor

[57] ABSTRACT

For the transfer of laser light into an optical fiber in such a manipulator device a laser beam is made to form a very finely focused spot of light on the end face of an optical fiber. In order to obtain an optimal transfer efficiency the manipulator includes firstly a plug member with fiber and focusing lens adjustable in the optical axial direction (z-direction) and, secondly, a supporting tube disposed in the z-direction in front of the lens for an optical glass body. Said supporting tube is adjustable in x- and y-directions at right angles to the z-axis, against the bias force from a spring member and angularly adjustable in relation to the z-axis.

8 Claims, 1 Drawing Sheet

MANIPULATOR DEVICE FOR THE TRANSFER OF LASER LIGHT INTO AN OPTICAL FIBER

BACKGROUND OF THE INVENTION

The invention relates to a manipulator device for the transfer of laser light into an optical fibre and of the type comprising supporting means for an optical fibre, means for adjusting the position of the end face of the optical fibre in the axial direction (z-axis) of the fibre corresponding to the optical axis of the manipulator and in relation to a focused laser beam, an optical system for the focusing of a laser beam arriving substantially axially at an end face of the optical fibre, means for adjusting the spot of light provided by the focused laser beam on the end face of the fibre in two axial x- and y-directions perpendicular to each other and to said z-axis, and means for angularly adjusting the axial direction of the fibre in relation to the axial direction of the laser beam incident on the end face of the fibre.

A manipulator device of the above mentioned type is diclosed in U.S. Patent No. 4,542,956.

By passing laser light onto the end face of an optical fibre a series of demands to be satisfied are made with a view to obtain an optimum transferring efficiency, 1. The laser beam arriving from a laser source is to be focused on the fibre end face to a diameter corresponding to the diameter of the fibre core, with a precision within fractions of $\mu$m.

2. The position of the focusing point in the longitudinal direction of the fibre—defined as the z-axis in a rectangular system of co-ordinates—is to be located at the end face of the fibre, with a precision within some few $\mu$m.

3. The position of the focusing point in a plane perpendicular to the z-axis, i.e. an x-y-plane must coincide with the centre of the fibrous core, with a precision within fractions of $\mu$m.

4. The angle between the end face of the fibre and the laser beam focused thereat—angle defined by its angular components $\theta_x$ and $\theta_y$—should be of 90°, within $\mu$rad.

5. The orientation between the polarization direction of the laser light and the polarization axis of the fibre should be within a few $\mu$rad.

In the known manipulator some of the above enumerated demands appear to be fulfilled—at any rate items 1 to 4 —by a structure in which a microscope objective coarsely adjustable in the axial z-direction is used for focusing on a holder and in which a separate fibre holder is used for fine z-, x- and y-adjustment of the end face of the fibre in relation to said objective, and in which the angle between the end face of the fibre and the laser beam is adjusted by tilting said two holders in relation to each other.

It is well known that it may be extremely difficult to effect a fine adjustment or minute trimming of various components of an optical system when different adjustment parameters, viz. x, y, z, $\theta_x$, $\theta_y$ in the present case, affect each other so that a previously adjusted parameter changes as soon as another parameter is being adjusted.

Moreover, the interspace between the objective and the end face of the fibre, i.e. the focusing zone in the prior manipulator is freely accessible so that said known structure does not take additional parameters into account that may influence the passing efficiency, viz. temperature and vibration stability, humidity and dust on the objective and the end face of the fibre, and so on.

SUMMARY OF THE INVENTION

The invention differs from the above prior art in that the transferring manipulator device includes, a housing adapted to be located in the path of the laser beam and provided with an inlet opening for the arriving laser beam, a mainly tubular plug means displaceable in the axial z-direction in relation to the housing for the optical fibre and for focusing optics, resp., the latter being substantially axially centred on the axis of the fibre, a supporting tube accommodated in the housing for an optical glass body axially disposed on the z-axis, and means for maintaining the supporting tube in contact with adjusting means located respectively at either end of the supporting tube and adapted to adjust the position of supporting tube in relation to the z-axis in the housing.

The basic idea of the invention was to make solely the fibre and/or the supporting means for the fibre and the optics coarsely and finely adjustable in the axial z-direction, while the adjusting functions of the parameters x, y, $\theta_x$, $\theta_y$, in contradiction to the prior solution, have now been transferred to the glass member supporting tube that is x-y-displaceable and tiltable within the housing by means of the adjusting means.

It is then possible—this will be explained more specifically later on in the description—to trim said five parameters (x, y, z, $\theta_x$, $\theta_y$) mutually independently, and a very minute trimming is obtained by means of the optical body, since the beam moves only a little even in case of large movements of the glass body.

Moreover, a series of advantages is obtained. Firstly, all of the active components of the manipulator are encapsulated within the housing and thus protected against physical influences from outside.

A very light and compact structure constituted by a few components is obtained.

Said maintaining means may advantageously consist in that the adjusting means are made from soft iron and that at least part of the supporting tube is magnetic. The magnetic force will thus maintain the supporting tube in contact with the adjusting means.

According to an advantageous embodiment of the invention a spring member may be positioned substantially in the bisecting plane between a plane including the x-axis and the z-axis and a plane including the y-axis and the z-axis, while the adjusting means are located substantially in the first and the second, respectively, of two planes (x,z), (y,z) on the opposite side of the supporting tube in relation to the spring member. This provides for obtaining an essentially symmetrical, balanced structure in which the spring member offers a uniform counterforce to the adjusting means.

The glass body may preferably have a substantially plane beam input face and a substantially curved beam output face.

A particularly advantageous embodiment of the invention may be characterized in that two of said adjusting means are located with their x-y-plane in coincidence with or substantially in coincidence with the main plane of the output face of the optical glass body, while two other of said adjusting means are located with their x-y-plane in the proximity of the input face of the glass body.

Said embodiment in which the glass body within its supporting tube may be made to pivot about an axis perpendicular to the z-axis and coincident or substantially coincident with the main plane of the output face of the glass body, provides for obtaining a total or almost total decoupling between parameters x, y and $\theta_x$, $\theta_y$.

BRIEF DESCRIPTION OF THE DRAWINGS

The invention will now be explained in more detail with reference to the schemtical drawing, in which.

DETAILED DESCRIPTION OF THE INVENTION

Figure 1:
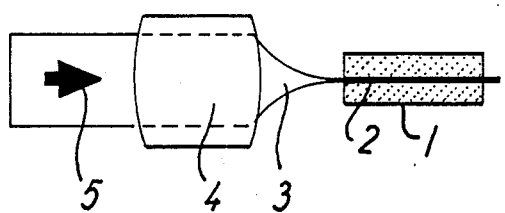
FIG. 1 is a principle diagram illustrating the passing of laser light onto an optical fibre.

FIG. 1 is a principle diagram for passing laser light into an optical fibre. 1 illustrates the optical fibre and 2 illustrates the light conducting core of the fibre having a diameter of e.g. 5 μm. 4 illustrates focusing optics receiving a collimated laser beam 5 arriving in the direction shown by the arrow and passing, as illustrated at 3, a focused laser beam to the end face of the fibre.

Figure 2:
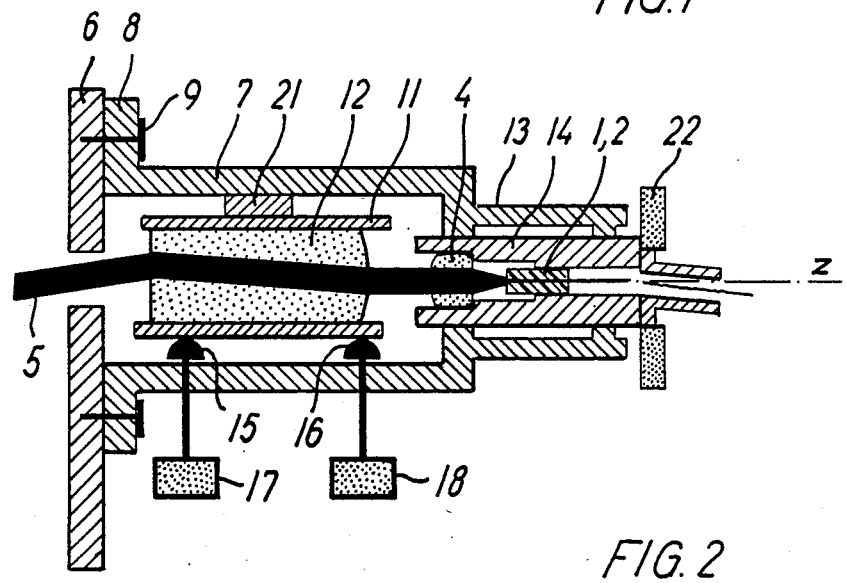
FIG. 2 is an axial section through a transferring manipulator device according to the invention.
Figure 3:
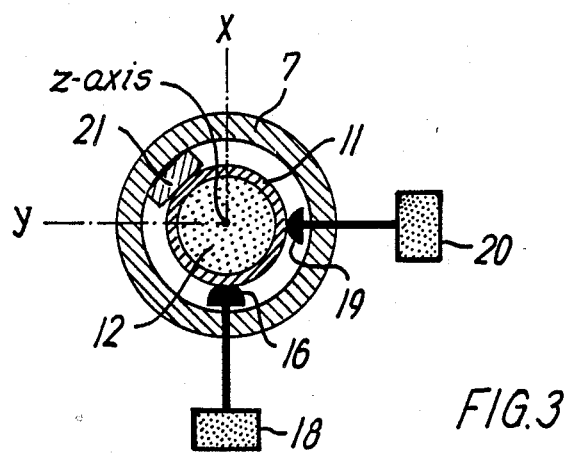
FIG. 3 is a cross-section through part of the manipulator device according to the invention.

In respect of the following description a rectangular coordinate system is defined having a z-axis coinciding with the optical axis of the manipulator device, an x-axis located for instance in the plane of FIG. 2, and a y-axis extending perpendicularly to the plane of FIG. 2, cf. also FIG. 3.

In order to obtain an optimal transfer efficiency there is a series of demands to be complied with.

the laser beam is to be focused to a diameter corresponding to the diameter of the fibre core, with a precision within fractions of μm, the position of the focusing point in the longitudinal direction of the fibre, i.e. in the axial z-direction, is to be located at the end face of the fibre, with a precision within a few μm, the position of the focusing point in a plane perpendicular to the z-axis, i.e. in relation of the directions of x- and y-axes is to be located in the centre of the fibre, with a precision within fractions of μm, the angle between the end face of the fibre and the focused laser beam 3—angle defined hereinafter by its components $\theta_x$ and $\theta_y$ in relation to the x- and y-axes, resp., should be at right angles, within μmrad, and the orientation of the polarization direction of the laser light in relation to the polarization axis ($\alpha$) of the fibre should be within a few mrad.

FIG. 2 is a longitudinal section through an embodiment of the transferring manipulator device according to the invention. The manipulator device is mounted on an optical bench (not shown) by means of a vertical supporting plate 6. The manipulator device includes a housing 7 provided at its one end with a flange 8 which by screws 9 is tightened against the supporting plate 6. The supporting plate 6 has an aperture 10 for passing a laser beam 5 arriving from a laser.

A supporting tube for an optical glass body 12 is accommodated in the interior of housing 7. At its end facing away from the supporting plate 6 the housing 7 is provided with a tube member 13 into which a plug member 14 is inserted. Said plug member 14 is tubular as shown and accommodates, on one hand, a beam focusing lens, viz. the previously mentioned optics 4 and, on the other hand, the fibre 1, 2 proper, the function of said plug member being explained later on.

The housing 7 is further equipped with four screws, e.g. micrometer screws for the adjustment of the tube 11 supporting the glass body 12, viz. two screws in the x-plane (FIG. 2) with heads 15, 16 in abutment against the supporting tube 11 and with associated fingerholds 17 and 18, resp., accessible outside the housing and two similar screws in the y-plane (FIG. 3). Obviously, FIG. 3 only shows the foremost of said two screws in the y-plane, the head 19 abutting against the supporting tube 11 and with associated fingerhold 20 accessible outside the housing, the second one of latter two screws in the y-plane being here located behind the drawing plane of FIG. 3.

Referring again to FIG. 2 the x-adjusting screw 15, 26 and the associated y-adjusting screw, not shown, are disposed in a plane perpendicular to the optical axis (z-axis) at the end of the supporting tube 11 located closest to the supporting plate 6, while the second x-adjusting screw 16, 18 and the associated y-adjusting screw 19, 20 (FIG. 3) are likewise disposed in a plane perpendicular to the optical axis (z-axis) at the end of the supporting tube 11 closest to the focusing lens 4.

A spring member 21 made from metal, rubber or an elastomeric material is moreover located between the housing 7 and the supporting tube 11, preferably midway between the first set of the x-y-adjusting screws at one end of the supporting tube 11 and the second set of x-y-adjusting screws 16, 18; 19, 20 (FIG. 3) at the opposite end of the supporting tube 11.

With reference to FIG. 3 it will be seen that said spring member 21 is also centred in the bisecting plane between the x-plane and the y-plane, i.e. positioned on the opposite side of the supporting tube 11 in relation to the two sets of x-y-adjusting screws. Said spring member urges the supporting tube 11 against the four screw heads.

Instead of the spring member an alternative solution is to make use of screws made from soft iron and a supporting tube 11 made from magnetic material so that the tubing is urged against the screws by the magnetic force.

At the end of the plug member farthest off in relation to the supporting plate there is provided an adjusting ring 22 adapted to effect by rotation trimming of the polarization axis of the fibre relative to the polarization direction of the laser light and to effect by axial displacement a fine trimming of the position of the fibre end in the z-direction.

As regards the glass body 12 accommodated within the supporting tube it is further observed that it has a plane or substantially plane input face for the arriving laser beam 5 and a curved plane output face for the laser beam passing onto the lens 4.

The function mode of the manipulator device herein described will now be explained in detail.

The arriving laser beam 5 is received by the input face of the glass body 12, penetrates the glass body, leaves the output face of the glass body, passes onto the focusing lens 4 and is focused by said lens at the end face of the optical fibre. By means of a measuring arrangement, not shown, including for instance light sensitive diodes or optical means connected to the fibre or the manipulator the light power is measured, the aim being to obtain a maximum light power corresponding to an optimum adjustment in the manipulator.

A coarse adjustment in the z-direction is effected by axially displacing the fibre 1, 2 in one direction or the other in plug member 14 in housing 7 and fine adjustment by displacing the plug member 14 in relation to the tube member 13 and thus in relation to the housing 7. By means of screws 16, 18; 19, 20 closest to the lens 4 a fine adjustment is effected in the x- and y-directions, the supporting tube 11 for the glass body 12 being thereby made to pivot against the force of the spring member 21 urging continuously the supporting tube against the screw heads.

By means of the second set of screws, viz. the x-screw 15, 17 and the associated y-screw (not shown) closest to the input face of the glass body the angle of the glass body is adjusted in relation to the z-axis, i.e. tilting of the glass body, still against the spring force of the spring member 21. This provides for fine trimming of $\theta_x$ and $\theta_y$. It is pointed out that there is no coupling between the angular adjustment and the adjustement of the x-y-position when tilting the glass body 11 in relation to the apex of its curved output face.

It is further observed that the x-y-adjustment by screws 16, 18; 19, 20 at th end of the glass body 12 located closest to the focusing lens 4 will provide a weak coupling in relation to $\theta_x$ and $\theta_y$, but by finally adjusting the second set of screws said coupling is eliminated. Axially fine adjustment (z-direction) and fine trimming of the polarization conditions are eventually effected by means of the adjusting ring 22.

A manipulator device designed as specified above makes it possible to trim the five previously mentioned parameters mutually independently. Due to the shape of the optical, tiltable glass body 12 with plane input face and curved output face a very minute trimming is obtained, since the beam only moves a little, even though the glass body performs a large movement. In reality, and by way of comparison with a mechanical construction without glass body, this provides for obtaining a gearing ratio that is more than ten times better. Per se, this implies moreover the supplementary advantage that due to the down-gearing effect of the glass body there is no need to make use of adjusting screws of very fine tolerances.

Furthermore, the end face proper of the fibre is encapsulated behind the focusing lens and any optical and movable components are embedded within the housing and thus also protected.

It should finally be noticed that the plug member 14 may be fully decoupled from the manipulator device and later on plugged in again and that a suitable pretrimming with a suitable plugging-in efficiency being still ensured, possibly after a desired repeated fine trimming in the z-direction.

Obviously, modifications and variations of the manipulator device are possible in view of the above disclosure and within the scope of the invention.

What is claimed is:

1. A manipulator device for the transfer of laser light into an optical fibre and of the type comprising
   supporting means for an optical fibre,
   means for adjusting the position of the end face of the optical fibre in the axial direction (z-axis) of the fibre corresponding to the optical axis of the manipulator and in relation to a focused laser beam,
   an optical system for the focusing of a laser beam arriving substantially axially at an end surface of the optical fibre,
   means for adjusting the spot of light provided by the focused laser beam on the end face of the fibre in two axial x- and y-directions perpendicular to each other and to said z-axis, and
   means for angularly adjusting the axial direction of the fibre in relation to the axial direction of the laser beam incident on the end face of the fibre,
   housing means adapted to be located in the path of the laser beam and provided with an inlet opening for the arriving laser beam,
   a mainly tubular plug means displaceable in the axial z-direction in relation to the housing for the optical fibre and for focusing optics, resp., the latter being substantially axially centred on the axis of the fibre,
   a supporting tube accommodated in the housing for an optical glass body axially disposed on the z-axis,
   and means for maintaining the supporting tube in contact with adjusting means located respectively at either end of the supporting tube and adapted to adjust the position of the supporting tube in relation to the z-axis in the housing means.

2. A manipulator device as claimed in claim 1, wherein said maintaining means consist in that the adjusting means are made from soft iron and that at least part of the supporting tube is magnetic.

3. A manipulator device as claimed in claim 1, wherein a spring member is positioned substantially in the bisecting plane between a plane including the x-axis and the z-axis and a plane including the y-axis and the z-axis, and the adjusting means are located substantially in the first and the second, respectively, of two planes (x.z), (y,z) on the opposite side of the supporting tube in relation to the spring member.

4. A manipulator device as claimed in claim 1, wherein said glass body has a substantially plane beam input face and a substantially curved beam output face.

5. A manipulator device as claimed in claim 1, wherein said adjusting means are constituted by adjustable screws extending through the wall of the housing and directed towards the z-axis, one end of said screws being in abutment against the supporting tube and the other end outside the housing being accessible for adjustment.

6. A manipulator device as claimed in claim 5, wherein two of said adjusting means are located with their x-y-plane in coincidence with or substantially in coincidence with the main plane of the output face of the optical glass body, while two other of said adjusting means are located with their x-y-plane in the proximity of the input face of the glass body.

7. A manipulator device as claimed in claim 1 wherein said tubular supporting means is rotatable about the z-axis.

8. A manipulator device as claimed in claim 1 wherein said tubular supporting means is adapted so that it may be removed from the housing and plugged in again.

* * * * *